United States Patent
Shen et al.

(10) Patent No.: US 11,243,442 B1
(45) Date of Patent: Feb. 8, 2022

(54) MODULATED TERAHERTZ (THZ) SIGNAL DEFLECTOR AND PREPARATION METHOD THEREOF

(71) Applicant: GUANGZHOU RAILWAY POLYTECHNIC, Guangdong (CN)

(72) Inventors: Yanchun Shen, Guangdong (CN); Jinlan Wang, Guangdong (CN); Ximing Qiao, Guangdong (CN)

(73) Assignee: GUANGZHOU RAILWAY POLYTECHNIC, Guangzhou (CN)

( * ) Notice: Subject to any disclaimer, the term of this patent is extended or adjusted under 35 U.S.C. 154(b) by 0 days.

(21) Appl. No.: 17/357,908

(22) Filed: Jun. 24, 2021

Related U.S. Application Data

(63) Continuation of application No. PCT/CN2020/126014, filed on Nov. 3, 2020.

(30) Foreign Application Priority Data

Oct. 28, 2020 (CN) .......................... 202011177646.9

(51) Int. Cl.
*G02F 1/1337* (2006.01)
*G02F 1/1343* (2006.01)
*G02F 1/1334* (2006.01)
*G02F 1/139* (2006.01)
*G01N 21/3581* (2014.01)

(52) U.S. Cl.
CPC ..... *G02F 1/13439* (2013.01); *G01N 21/3581* (2013.01); *G02F 1/139* (2013.01); *G02F 1/1334* (2013.01); *G02F 1/13378* (2013.01)

(58) Field of Classification Search
CPC ............ G02F 1/1333; G02F 1/133302; G02F 1/133305; G02F 1/1337; G02F 1/133738; G02F 1/13; G02F 1/13439; G02F 1/13363; G02F 1/1343; G02F 1/1339; G02F 1/139; G02F 1/1393; G02F 1/1395; G02F 1/1334; G01N 21/3581
See application file for complete search history.

(56) References Cited

U.S. PATENT DOCUMENTS

| | | | |
|---|---|---|---|
| 2007/0252992 A1* | 11/2007 | Itsuji | G01N 21/21 356/369 |
| 2018/0284502 A1* | 10/2018 | Yokoyama | G02F 1/1337 |

FOREIGN PATENT DOCUMENTS

CN  106959547 A  7/2017

* cited by examiner

*Primary Examiner* — Thoi V Duong

(57) ABSTRACT

Disclosed are a modulated terahertz (THz) signal deflector and a preparation method thereof. The modulated THz signal deflector includes: a first transparent substrate and a second transparent substrate that are oppositely disposed, a liquid crystal layer, a transparent electrode layer, and a photo-alignment layer, wherein the photo-alignment layer has a control graph in which a molecule director is periodically and gradiently distributed along a specific direction, and the control graph is configured to control a liquid crystal molecule director in the liquid crystal layer to be periodically and gradiently distributed along a specific direction to form a blazed-grating phase distribution based on a geometric phase, and deflect an incident circularly polarized THz signal to a specific angle. The deflector provided in the present disclosure can deflect a THz signal to a specific angle, and can switch signal deflection and non-deflection functions by powering up a transparent electrode.

5 Claims, 7 Drawing Sheets

| Coat a material with high transmittance and good conductivity on one side of a transparent substrate to form a transparent electrode layer, to obtain a conductive substrate | S100 |

| Coat an alignment agent on the side, of the conductive substrate, coated with the transparent electrode layer, to form a photo-alignment layer to obtain a deflector substrate | S200 |

| Take two deflector substrates as a first deflector substrate and a second deflector substrate | S300 |

| Dispose the first deflector substrate and the second deflector substrate in parallel, dispose the photo-alignment layer of the first deflector substrate and the photo-alignment layer of the second deflector substrate oppositely, and relatively secure the first deflector substrate and the second deflector substrate by using a spacer, to obtain an empty substrate cartridge | S400 |

| Perform multi-step overlapping exposure on the empty substrate cartridge, so that the photo-alignment layer has a control graph in which a molecule director is periodically and gradiently distributed along a specific direction | S500 |

| Perfuse a dielectric material with birefringence between the first deflector substrate and the second deflector substrate of the empty substrate cartridge to form a liquid crystal layer | S600 |

FIG. 10

MODULATED TERAHERTZ (THZ) SIGNAL DEFLECTOR AND PREPARATION METHOD THEREOF

CROSS REFERENCE TO RELATED APPLICATIONS

The present application is a Continuation Application of PCT Application No. PCT/CN2020/126014 filed on Nov. 3, 2020, which claims the benefit of Chinese Patent Application No. 202011177646.9 filed on Oct. 28, 2020. All the above are hereby incorporated by reference. the contents of which are incorporated herein by reference in their entirety.

TECHNICAL FIELD

The present disclosure relates to the technical field of photoelectric metering, and in particular, to a modulated terahertz (THz) signal deflector and a preparation method thereof.

BACKGROUND

A THz signal is at a frequency of 0.1-10 THz (a corresponding wavelength is 30-3000 μm). Due to unique properties of the THz signal, a THz technology has broad application prospects in many fields, such as safety inspection, biomedicine, and high-speed wireless communication. Compared with THz sources and detectors, high-performance optical devices for transmitting and controlling the THz signal are still in their infancy. As one of basic elements for modulating the THz signal, a THz signal deflector is widely applied in a THz communications system. The THz signal deflector is usually made of a prism or an inclined phase plate, and its principle is accumulation of an optical path difference in a propagation direction. These devices are bulky and difficult to achieve a design of a miniaturized and integrated system. Although a THz signal deflector designed and prepared based on metasurface is gradually developed to realize light and thin structure, it has low efficiency, a narrow modulated band range, and poor tunability. Therefore, a modulated THz signal deflector needs to be developed to achieve dynamic, efficient, and wide-band THz signal deflection to meet demands of practical application.

SUMMARY

An objective of the present disclosure is to provide a modulated THz signal deflector and a preparation method thereof, to resolve problems of low efficiency, a narrow modulated band range, and poor tunability of an existing THz signal deflector, achieve dynamic, efficient, and wide-band THz signal deflection, and meet demands of practical application.

To achieve the foregoing objective, an embodiment of the present disclosure provides a modulated THz signal deflector, including:

a first transparent substrate and a second transparent substrate that are oppositely disposed, and a liquid crystal layer located between the first transparent substrate and the second transparent substrate, wherein a first transparent electrode layer and a second transparent electrode layer are respectively disposed on sides, adjacent to the liquid crystal layer, of the first transparent substrate and the second transparent substrate;

a first photo-alignment layer and a second photo-alignment layer are respectively disposed on sides, adjacent to the liquid crystal layer, of the first transparent electrode layer and the second transparent electrode layer; and the first transparent electrode layer and the second transparent electrode layer are both made of a material with high transmittance and good conductivity in a THz band; the photo-alignment layer has a control graph in which a molecule director is periodically and gradiently distributed along a specific direction; and the control graph is configured to control a liquid crystal molecule director in the liquid crystal layer to be periodically and gradiently distributed along a specific direction to form a blazed-grating phase distribution based on a geometric phase, and deflect an incident circularly polarized THz signal to a specific angle.

Preferably, the signal deflector further includes a spacer located between the first transparent substrate and the second transparent substrate, wherein the spacer is configured to support the first transparent substrate and the second transparent substrate to form filling space of the liquid crystal layer.

Preferably, a thickness of the liquid crystal layer is 200-700 μm.

Preferably, the material used for the first transparent electrode layer and the second transparent electrode layer includes graphene, PEDOT, or a metal wire grid.

Preferably, the liquid crystal layer is made of a dielectric material with birefringence.

Preferably, the birefringence of the liquid crystal layer is greater than or equal to 0.2 and less than or equal to 0.4.

An embodiment of the present disclosure further provides a preparation method for a modulated THz signal deflector, including:

coating a material with high transmittance and good conductivity on one side of a transparent substrate to form a transparent electrode layer, to obtain a conductive substrate;

coating an alignment agent on the side, of the conductive substrate, coated with the transparent electrode layer, to form a photo-alignment layer to obtain a deflector substrate;

taking two deflector substrates as a first deflector substrate and a second deflector substrate;

disposing the first deflector substrate and the second deflector substrate in parallel, disposing the photo-alignment layer of the first deflector substrate and the photo-alignment layer of the second deflector substrate oppositely, and relatively securing the first deflector substrate and the second deflector substrate by using a spacer, to obtain an empty substrate cartridge;

performing multi-step overlapping exposure on the empty substrate cartridge, so that the photo-alignment layer has a control graph in which a molecule director is periodically and gradiently distributed along a specific direction; and perfusing a dielectric material with birefringence between the first deflector substrate and the second deflector substrate of the empty substrate cartridge to form a liquid crystal layer, wherein a liquid crystal molecule director in the liquid crystal layer is affected by the control graph of the photo-alignment layer, and the liquid crystal molecule director is periodically and gradiently distributed along a specific direction.

Preferably, before the coating an alignment agent on the side, of the conductive substrate, coated with the transparent electrode layer to form a photo-alignment layer to obtain a deflector substrate, the method further includes:

ultrasonically cleaning the transparent substrate with washing solution for 20-40 minutes, and then ultrasonically cleaning the transparent substrate twice with ultra-pure water for 8-10 minutes each time; drying the transparent substrate in an oven at 100° C. to 120° C. for 40-60 minutes; and finally cleaning the transparent substrate with ultraviolet light and ozone for 30-45 minutes. The washing solution is absolute anhydrous alcohol.

Preferably, the transparent substrate is made of a material with high transmittance and a low loss rate in a THz band, such as quartz glass or a silicon wafer.

Preferably, when the dielectric material with birefringence is perfused between the first deflector substrate and the second deflector substrate, the temperature of the dielectric material is 170° C. to 190° C.

The embodiments of the present disclosure have the following beneficial effects:

The present disclosure provides a modulated THz signal deflector, including: a first transparent substrate and a second transparent substrate that are oppositely disposed, and a liquid crystal layer located between the first transparent substrate and the second transparent substrate, wherein a first transparent electrode layer and a second transparent electrode layer are respectively disposed on sides, adjacent to the liquid crystal layer, of the first transparent substrate and the second transparent substrate; a first photo-alignment layer and a second photo-alignment layer are respectively disposed on sides, adjacent to the liquid crystal layer, of the first transparent electrode layer and the second transparent electrode layer; the first transparent electrode layer and the second transparent electrode layer are made of a material with high transmittance and good conductivity in a THz band; the photo-alignment layer has a control graph in which a molecule director is periodically and gradiently distributed along a specific direction; and the control graph is configured to control a liquid crystal molecule director in the liquid crystal layer to be periodically and gradiently distributed along a specific direction to form a blazed-grating phase distribution based on a geometric phase, and deflect an incident circularly polarized THz signal to a specific angle. The THz signal deflector applicable to a wide band and based on an electrically modulated liquid crystal provided in the embodiments is applicable to a wide band, and is miniaturized and easily integrated. Compared with the THz signal deflector made by using a quartz crystal and a metasurface in the prior art, the THz signal deflector in the present disclosure has obvious advantages. Through flexible exposure pattern design, THz signal deflectors with different deflection angles can be made, and have a great application potential in THz communication and other fields.

BRIEF DESCRIPTION OF THE DRAWINGS

To describe the technical solutions in the present disclosure more clearly, the following briefly describes the accompanying drawings required for describing the implementations. Obviously, the accompanying drawings in the following description merely show some implementations of the present disclosure, and a person of ordinary skill in the art may further derive other drawings from these accompanying drawings without involving inventive effort.

FIG. 10. is a schematic flowchart of a preparation method for a modulated THz signal deflector according to an embodiment of the present disclosure.

DETAILED DESCRIPTION

The technical solutions of the embodiments of the present disclosure are clearly and completely described below with reference to the accompanying drawings in the embodiments of the present disclosure. Obviously, the described embodiments are merely a part rather than all of the embodiments of the present disclosure. All other embodiments obtained by a person of ordinary skill in the art based on the embodiments of the present disclosure without involving inventive effort shall fall within the protection scope of the present disclosure.

It should be understood that step numbers in the present disclosure are only intended to facilitate description, and are not be used to limit a sequence of steps.

It should be understood that the terms used in the specification of the present disclosure are for the purpose of describing specific embodiments only and are not intended to limit the present disclosure. As used in the specification of the present disclosure and the appended claims, the singular forms "a", "an" and "the" are intended to include the plural forms unless the context clearly indicates otherwise.

The terms "include" and "comprise" indicate the existence of the described feature, entity, step, operation, element and/or component, but do not exclude the existence or addition of one or more other features, entities, steps, operations, elements, components and/or a combination thereof.

The term "and/or" refers to one of or any combination or all possible combinations of more of items listed in association, and includes these combinations.

Figure 1:
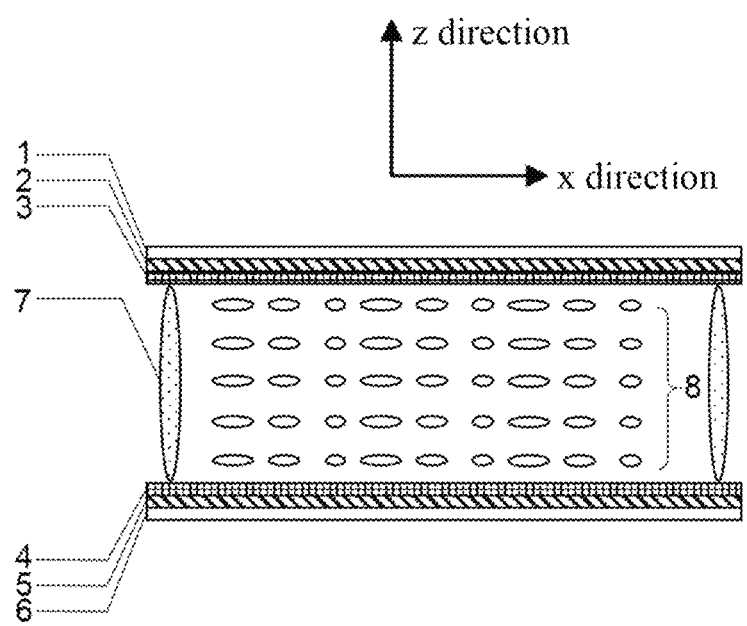
FIG. 1. is a schematic diagram of a cross-sectional structure of a modulated THz signal deflector according to an embodiment of the present disclosure.

Refer to FIG. 1.

An embodiment of the present disclosure provides a modulated THz signal deflector, including: a first transparent substrate 1 and a second transparent substrate 6 that are oppositely disposed, and a liquid crystal layer 8 located between the first transparent substrate 1 and the second transparent substrate 6. A first transparent electrode layer 2 and a second transparent electrode layer 5 are respectively disposed on sides, adjacent to the liquid crystal layer 8, of the first transparent substrate 1 and the second transparent substrate 6. A first photo-alignment layer 3 and a second photo-alignment layer 4 are respectively disposed on sides, adjacent to the liquid crystal layer 8, of the first transparent electrode layer 2 and the second transparent electrode layer 5. The first transparent electrode layer 2 and the second transparent electrode layer 5 are made of a material with high transmittance and good conductivity in a THz band, including graphene, a metal wire grid, or PEDOT (the PEDOT is a polymer of 3,4-ethylenedioxythiophene (EDOT) monomers, and characterized by a simple molecular structure, a small energy gap and high conductivity. The PEDOT has been widely used for research of organic thin film solar cell materials, OLED materials, electrochromic materials, transparent electrode materials, and other fields). For example, the first transparent electrode layer 2 and the second transparent electrode layer 5 are made of the graphene with high transmittance and good conductivity in a THz band. The photo-alignment layer has a control graph in which a molecule director is periodically and gradiently distributed along a specific direction. For example, the photo-alignment layer is made of an azo dye. The azo dye is sensitive to linearly polarized ultraviolet light, and an alignment direction is perpendicular to a polarization direction when the photo-alignment layer is irradiated by the linearly polarized ultraviolet light. The control graph of the photo-alignment layer controls a liquid crystal molecule director in the liquid crystal layer 8 to be periodically and gradiently distributed along a specific direction to form a blazed-grating phase distribution based on a geometric phase, and deflects an incident circularly polarized THz signal to a specific angle.

Figure 2:
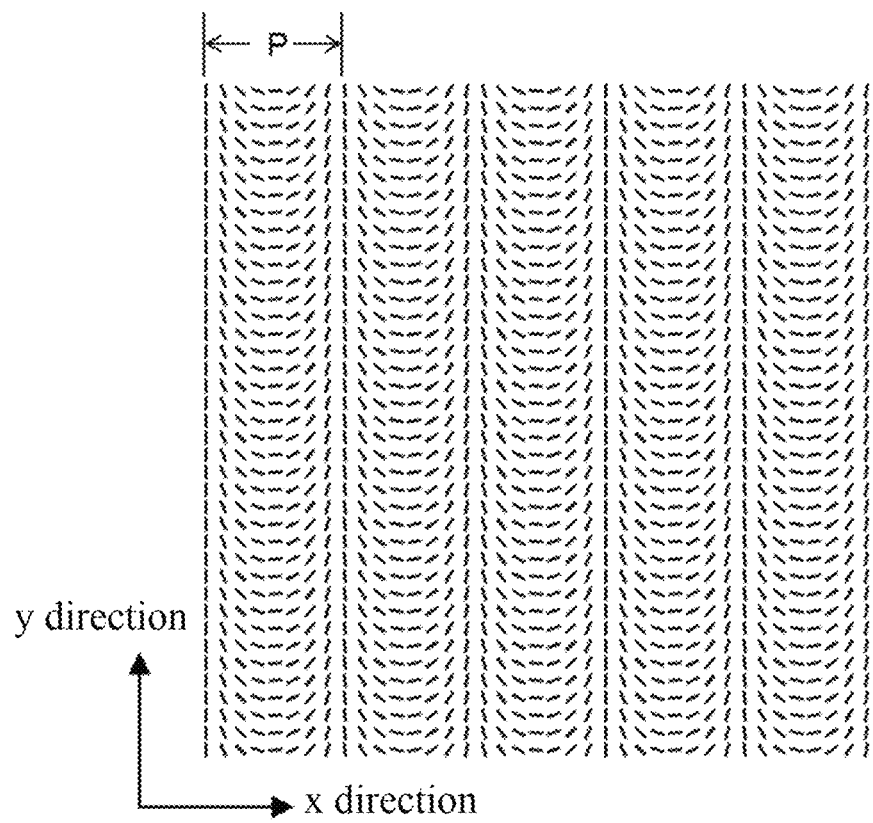
FIG. 2 is a schematic diagram simulating a distribution of a liquid crystal molecule director in a modulated THz signal deflector according to an embodiment of the present disclosure.

The geometric phase is a phase only related to a deflection direction of a crystal axis of a liquid crystal. When left (right) circularly polarized light is incident into a geometric phase optical element, emergent right (left) circularly polarized light carries an additional phase that is numerically twice a deflection azimuth angle of the crystal axis of the liquid crystal. FIG. 2 is a schematic diagram simulating a distribution of a liquid crystal molecule director in a modulated THz signal deflector according to an embodiment of the present disclosure. The liquid crystal molecule director changes periodically from 0° to 180° in an x direction. Therefore, a resulting geometric phase changes periodically from 0° to 360° in the x direction, to generate an inclined phase of a blazed-grating, so that signal deflection to a specific angle can be achieved. For different deflection angles, a grating period P can be changed to obtain different signal deflection angles. The grating period P, the deflection angle θ, and a frequency f of incident light have the following relationship: P·sin θ=c/f, wherein c is the speed of light in vacuum. For example, in this embodiment of the present disclosure, a signal deflector with a deflection angle of 14° at a frequency of 1 THz is designed. The grating period P calculated according to the foregoing formula is 1240 μm.

The first transparent electrode layer 2 and the second transparent electrode layer 5 are made of the material with high transmittance and good conductivity in the THz band. The photo-alignment layer has the control graph in which the molecule director is periodically and gradiently distributed along the specific direction. The control graph is configured to control the liquid crystal molecule director in the liquid crystal layer 8 to be periodically and gradiently distributed along the specific direction to form the blazed-grating phase distribution based on the geometric phase, and deflect the incident circularly polarized THz signal to the specific angle.

The signal deflector further includes a spacer 7 located between the first transparent substrate 1 and the second transparent substrate 6, wherein the spacer 7 is configured to support the first transparent substrate 1 and the second transparent substrate 6 to form filling space of the liquid crystal layer 8. To enable a thickness of the liquid crystal layer 8 to meet a frequency range, namely, 0.6-1.4 THz, of light incident to the THz signal deflector, the thickness of the liquid crystal layer is designed to be 500 μm to achieve optimal modulation efficiency at the frequency of 1 THz.

To enable the thickness of the liquid crystal layer 8 to meet a half-wave condition of an incident THz signal, in other words, to meet the incident light frequency range of 0.6-1.4 THz, the thickness of the liquid crystal layer 8 is set to 200-700 μm.

Preferably, the liquid crystal layer 8 is made of a dielectric material with birefringence. A liquid crystal of the liquid crystal layer 8 is made of the material with birefringence in the THz signal segment, and the birefringence is a maximum difference between two or three main refractive indexes in a nonhomogeneous body. To enable the thickness of the liquid crystal layer 8 to meet the half-wave condition of the incident THz signal, in other words, to meet the incident light frequency range of 0.6-1.4 THz, the birefringence of the liquid crystal layer 8 is greater than or equal to 0.2 and less than or equal to 0.4. For example, optimally, to enable the thickness of the liquid crystal layer 8 to meet that the frequency range of the light incident to the THz signal deflector is 0.6-1.4 THz, the birefringence of the liquid crystal layer 8 is 0.3.

Figure 3:
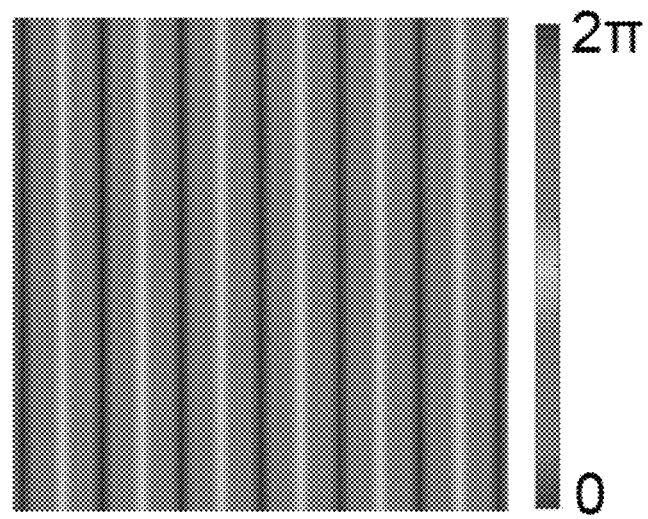
FIG. 3 is a schematic diagram simulating a phase distribution of a modulated THz signal deflector according to an embodiment of the present disclosure.
Figure 4:
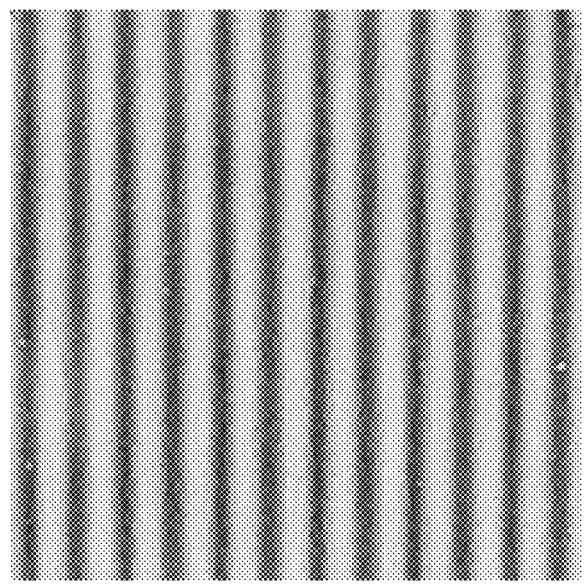
FIG. 4 shows a cross-polarized microscope picture of a modulated THz signal deflector according to an embodiment of the present disclosure.

Refer to FIG. 2 to FIG. 4.

FIG. 3 is a schematic diagram simulating a phase distribution of a modulated THz signal deflector according to an embodiment of the present disclosure. It can be seen that 0-360° phases change continuously and periodically in the x direction, and this is consistent with the designed distribution of the liquid crystal molecule director in FIG. 2. FIG. 4 shows a cross-polarized microscope picture of a modulated THz signal deflector made by using an ultraviolet polarized exposure alignment system based on a digital micro-mirror array. In this embodiment, brightness of the picture continuously changes with an azimuth within 360° in the x direction. The brightness change is a result of continuous periodic change of the liquid crystal molecule director. In FIG. 4, the brightness change from dark to bright and then to dark indicates that a direction of the liquid crystal molecule director gradually changes from 0° to 90°. The entire brightness change is consistent with the theoretical distribution of the liquid crystal molecule director in FIG. 2.

In a specific embodiment, the liquid crystal molecule director is periodically and gradiently distributed from 0° to 180° along the x direction. After the incident circularly polarized THz signal passes through the signal deflector, phase modulation of a brazed-grating type is generated for the emergent orthogonal circularly polarized THz signal to deflect the THz signal by an angle. The modulation effect can cover a wide THz frequency range. If an incident orthogonal circular polarization state is changed, the deflection angle changes symmetrically along a propagation direction.

Based on the foregoing embodiment, optionally, the thickness d of the liquid crystal layer meets the following condition: 200 μm≤d≤700 μm. It can be understood that, due to a phase delay condition, namely, $\Delta\varphi=2\pi\Delta nd/\lambda$, wherein $\Delta n$ represents a difference between birefringence of liquid crystal molecules and d represents the thickness of the liquid crystal layer. At a specific wavelength λ, the half-wave condition needs to be met to maximize the operation efficiency of the geometric phase optical element. For the THz signal deflector in this embodiment, a theoretically preferred value of the thickness d is 500 μm. If d is less than this preferred value, modulation efficiency gradually decreases. However, when the thickness of the liquid crystal layer is more than 700 μm, an alignment effect of the liquid crystal layer is poor. Therefore, in this embodiment, the thickness of the liquid crystal polymer film may be designed between 200 μm to 700 μm. When d is less than 200 μm, efficiency of the signal deflector is very low because phase accumulation of the THz signal passing through the signal deflector is far from meeting the half-wave condition of the THz signal segment. When d is greater than 700 μm, an alignment effect of a liquid crystal in the interlayer is poor, affecting the use of the signal deflector. Further, the preferred value of the thickness d of the liquid crystal polymer film is 500 μm. Under this thickness, the alignment effect is good and the modulation efficiency is high at the frequency of 1 THz.

Figure 5:
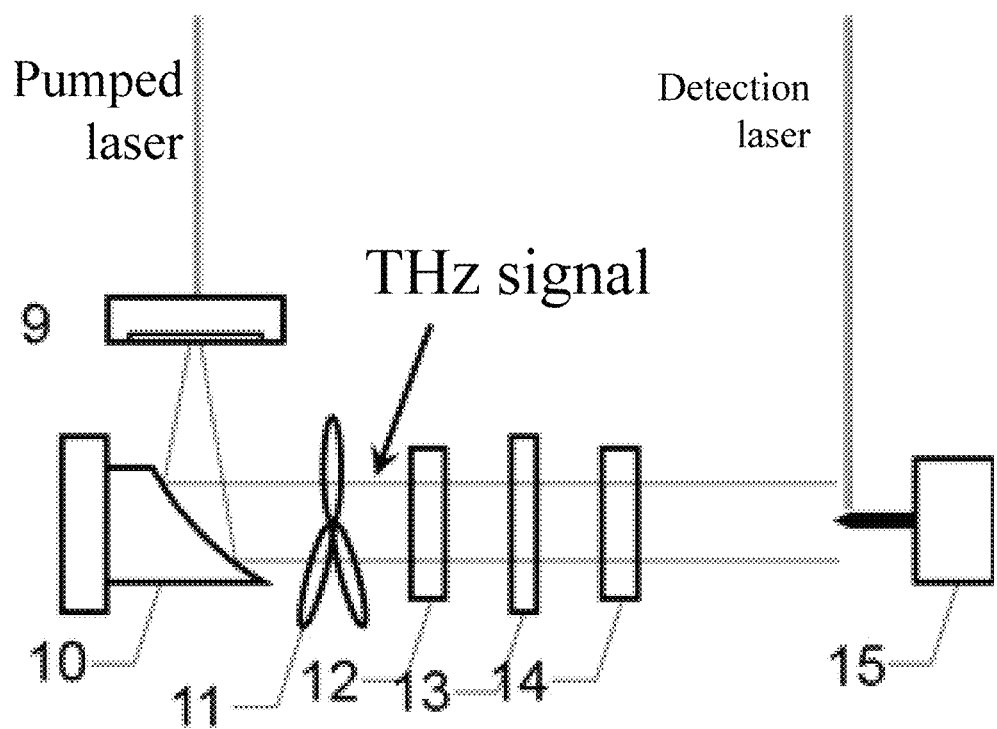
FIG. 5 is a schematic diagram of an optical path of a representation system of a modulated THz signal deflector according to an embodiment of the present disclosure.

Refer to FIG. 5.

FIG. 5 is a schematic diagram of an optical path of a representation system of a modulated THz signal deflector according to an embodiment of the present disclosure. The system includes the THz signal deflector 13 provided in the above embodiment, and further includes: a photoconductive antenna 9, configured to generate a linearly polarized THz signal; a metal parabolic mirror 10, located on an emergent optical path of the photoconductive antenna 9, and configured to converge and collimate the linearly polarized THz signal; a chopper 11, configured to convert the linearly polarized THz signal into pulse light; a first quarter-wave plate 12, configured to convert the linearly polarized THz signal into a circularly polarized THz signal; the THz signal deflector 13, configured to deflect the circularly polarized THz signal by a specific angle; a second quarter-wave plate 14, configured to convert the circularly polarized THz signal into the linearly polarized THz signal; and a photoconductive antenna probe 15, configured to detect a THz vortex beam. The chopper 11, the first quarter-wave plate 12, the THz signal deflector 13, the second quarter-wave plate 14, and the photoconductive antenna probe 15 share an optical axis with the metal parabolic mirror 10 and are arranged successively along the direction of emergent light of the metal parabolic mirror 10.

Figure 6:
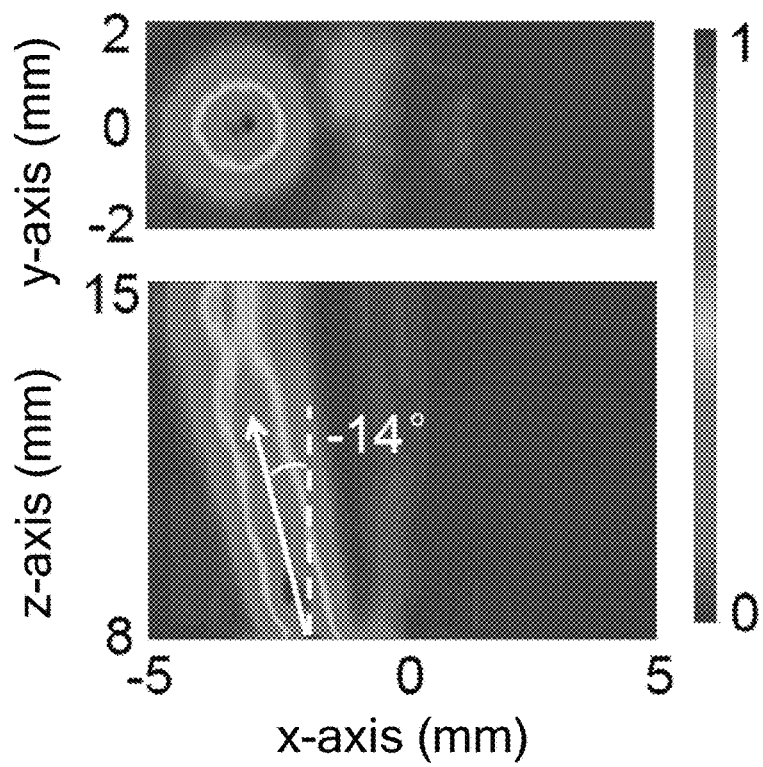
FIG. 6 is a schematic diagram of a normalized THz far-field intensity distribution at a frequency of 1 THz when a left circularly polarized THz signal is incident, wherein the xy plane is a THz signal transmission cross-section, and the xz plane is a THz signal transmission plane.
Figure 7:
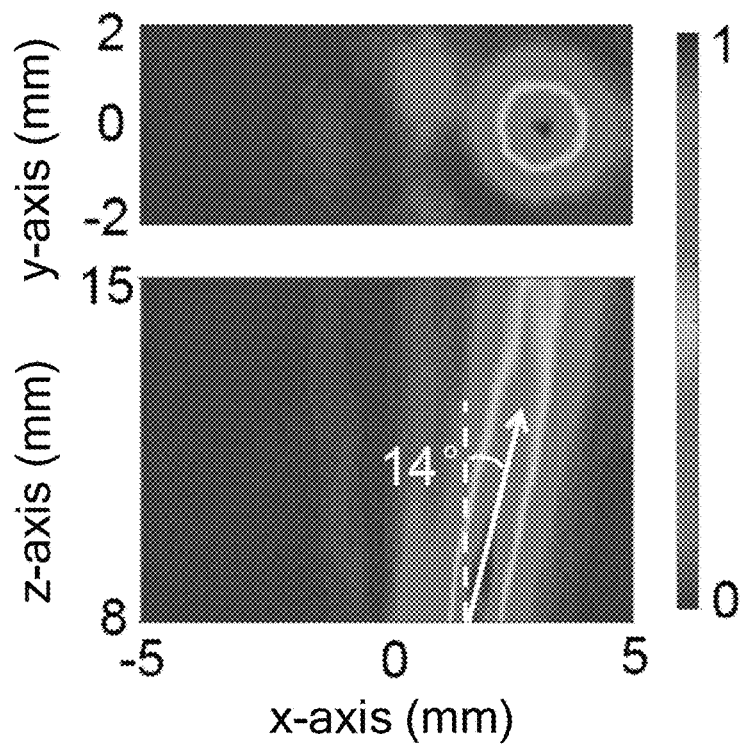
FIG. 7 is a schematic diagram of a normalized THz far-field intensity distribution at a frequency of 1 THz when a right circularly polarized THz signal is incident, wherein the xy plane is a THz signal transmission cross-section, and the xz plane is a THz signal transmission plane.

Refer to FIG. 6 and FIG. 7.

FIG. 6 is a schematic diagram of a normalized THz far-field intensity distribution at a frequency of 1 THz when a left circularly polarized THz signal is incident, wherein the xy plane is a THz signal transmission cross-section, and the xz plane is a THz signal transmission plane. It can be seen that in this case, a THz signal is deflected to the left, and a deflection angle is −14°, consistent with the designed deflection angle. FIG. 7 is a schematic diagram of a normalized THz far-field intensity distribution at a frequency of 1 THz when a right circularly polarized THz signal is incident, wherein the xy plane is a THz signal transmission cross-section, and the xz plane is a THz signal transmission plane. It can be seen that in this case, a THz signal is deflected to the right, which is conjugate with the case in FIG. 6, and a deflection angle is 14°, consistent with the designed deflection angle. Therefore, deflecting the THz signal on the left and right can be dynamically switched by switching left and right circular polarization states.

Figure 8:
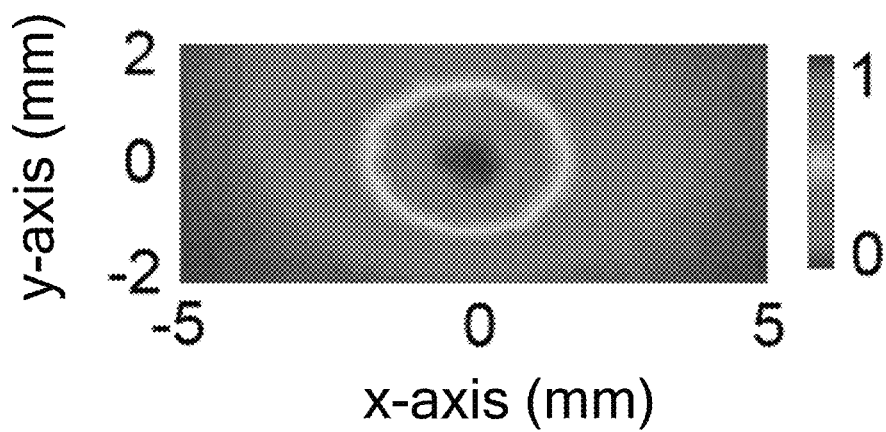
FIG. 8 is a schematic diagram of a normalized THz far-field intensity distribution at a frequency of 1 THz when a voltage of 200 V is imposed on a transparent electrode and a linearly polarized THz signal is incident.

Refer to FIG. 8.

To achieve dynamic modulation, the first transparent electrode layer 2 and the second transparent electrode layer 5 (i.e., the graphene transparent electrode) of the first transparent substrate 1 and the second transparent substrate 6 are powered up by using an alternating voltage until they are saturated. In the experiment, a voltage of 200 V is needed to deflect a pointing direction of the liquid crystal molecule under an electric field to a z-axis direction. In this case, because all liquid crystal molecules are deflected to the z-axis direction, the modulation effect of the geometric phase and the function of signal deflection disappear. Therefore, an incident THz signal directly passes through the sample without any modulation effect. FIG. 8 is a schematic diagram of a normalized THz far-field intensity distribution at a frequency of 1 THz when a voltage of 200 V is imposed on a transparent electrode layer and a linearly polarized THz signal is incident. It can be seen that a light spot appears in the middle instead of the left and right. This indicates that there is no deflection effect on the incident THz signal. The above result fully verifies a dynamic modulation effect of the THz signal deflector in this embodiment, and deflection and non-deflection functions can be dynamically switched.

Figure 9:
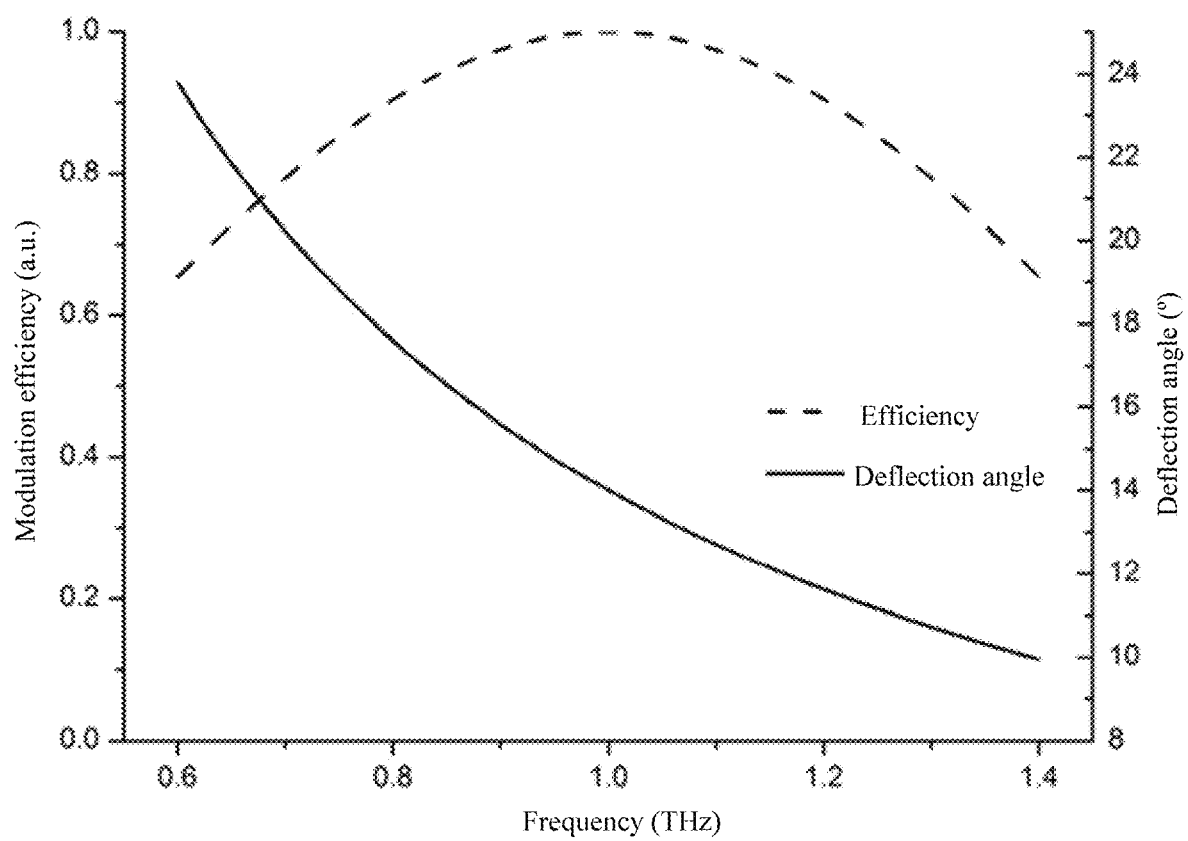
FIG. 9 is a curve chart of theoretical modulation efficiency and deflection angles of a modulated THz signal deflector at different THz frequencies according to an embodiment of the present disclosure.

Refer to FIG. 9.

FIG. 9 is a curve chart of theoretical modulation efficiency and deflection angles of a modulated THz signal deflector at different THz frequencies according to an embodiment of the present disclosure. The deflection angle θ and the frequency f have the following relationship: $\sin\theta=c/(f\cdot P)$. The deflection angle θ will gradually decrease as the frequency f increases. The modulation efficiency η and the frequency f have the following relationship: $\eta=\sin(\pi f\Delta nd/c)^2$, wherein $\Delta n$ represents the difference between the birefringence of the liquid crystal molecules, d represents the thickness of the liquid crystal layer, and c represents the speed of light in the vacuum. Because the thickness d is optimized at the frequency of 1 THz, it can be seen that theoretical modulation efficiency at the frequency of 1 THz is the highest, reaching 100%, and modulation efficiency gradually decreases as the frequency of 1 THz increases or decreases.

The THz signal deflector applicable to a wide band based on an electrically modulated liquid crystal in the embodiments is applicable to a wide band, and is miniaturized and easily integrated. Compared with an existing THz signal deflector made by using a quartz crystal and a metasurface, the THz signal deflector in the present disclosure has obvious advantages. Through flexible exposure pattern design, THz signal deflectors with different deflection angles can be made, and have a great application potential in THz communication and other fields.

Figure 11:
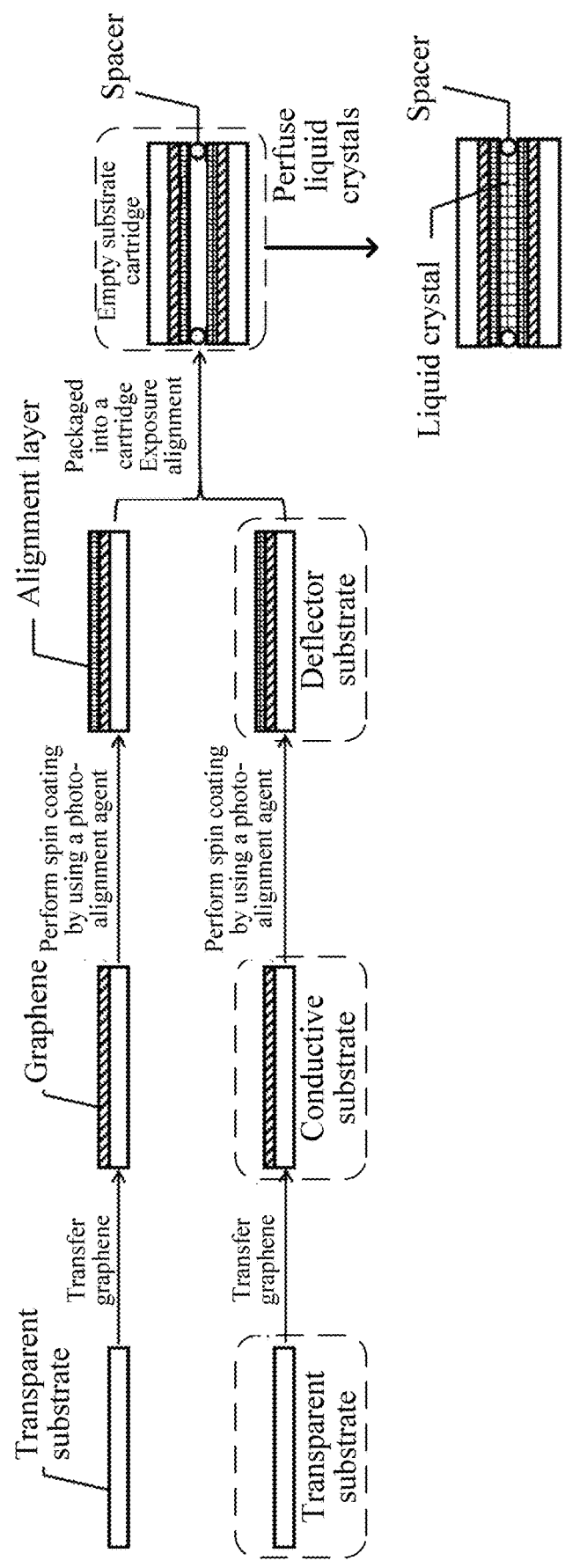
FIG. 11. is a schematic flowchart of a preparation method for a modulated THz signal deflector according to another embodiment of the present disclosure.

Refer to FIG. 10 and FIG. 11.

FIG. 10. is a schematic flowchart of a preparation method for a modulated THz signal deflector according to an embodiment of the present disclosure. FIG. 11 is a schematic flowchart of a preparation method for a modulated THz signal deflector according to an embodiment of the present disclosure. The preparation method for a modulated THz signal deflector provided in the embodiments of the present disclosure includes the following steps.

Step S100: Coat a material with high transmittance and good conductivity on one side of a transparent substrate to form a transparent electrode layer, to obtain a conductive substrate. For example, the transparent substrate is made of a material with high transmittance and a low loss rate in a THz band, such as quartz glass or a silicon wafer. The material with high transmittance and good conductivity includes graphene, PEDOT, or a metal wire grid.

Step S200: Coat an alignment agent on the side, of the conductive substrate, coated with the transparent electrode layer, to form a photo-alignment layer to obtain a deflector substrate. The alignment agent is coated on the side, of the conductive substrate, coated with the transparent electrode layer, to form the photo-alignment layer. The alignment agent is an azo dye. The azo dye is sensitive to linearly polarized ultraviolet light, and an alignment direction is perpendicular to a polarization direction when the photo-alignment layer is irradiated by the linearly polarized ultraviolet light. In the experiment, an arbitrary alignment direction that is designed can be controlled by irradiating a different alignment region each time by ultraviolet light with a different linear polarization direction. In a step of performing multi-step overlapping exposure on an empty substrate cartridge, "multi-step" refers to performing exposure for several times, and the region irradiated by the ultraviolet light each time is different, and a polarization direction each time is also different. "Overlapping" means that every two irradiated regions are overlapped, making a boundary region of alignment more continuous. The region irradiated each time changes periodically, and the polarization direction is rotated synchronously. In this way, the photo-alignment layer has a control graph in which a molecule director is periodically and gradiently distributed along a specific direction.

Step S300: Take two deflector substrates as a first deflector substrate and a second deflector substrate.

Step S400: Dispose the first deflector substrate and the second deflector substrate in parallel, dispose the photo-alignment layer of the first deflector substrate and the photo-alignment layer of the second deflector substrate oppositely, and relatively secure the first deflector substrate and the second deflector substrate by using a spacer 7, to obtain the empty substrate cartridge.

Step S500: Perform multi-step overlapping exposure on the empty substrate cartridge, so that the photo-alignment layer has the control graph in which the molecule director is periodically and gradiently distributed along the specific direction.

Step S600: Perfuse a dielectric material with birefringence between the first deflector substrate and the second deflector substrate of the empty substrate cartridge to form a liquid crystal layer 8, wherein a liquid crystal molecule director in the liquid crystal layer 8 is affected by the control graph of the photo-alignment layer, and the liquid crystal molecule director is periodically and gradiently distributed along a specific direction. For example, when the dielectric material with birefringence is perfused between the first deflector substrate and the second deflector substrate, the temperature of the dielectric material is 170° C. to 190° C.

Before step S200, the method further includes the following step:

Step S101: Ultrasonically clean the transparent substrate with washing solution for 20-40 minutes, and then ultrasonically clean the transparent substrate twice with ultrapure water for 8-10 minutes each time; dry the transparent substrate in an oven at 100° C. to 120° C. for 40-60 minutes; and finally clean the transparent substrate with ultraviolet light and ozone for 30-45 minutes.

The modulated THz signal deflector provided in the embodiments of the present disclosure can be applied to THz communications systems. In THz communication, beam forming needs to be performed on the THz signal by using a modulator, to emit the THz signal to different directions. Therefore, a low-cost, large-bandwidth and dynamically-modulated signal deflector is needed to achieve the above functions.

The descriptions above are preferred implementations of the present disclosure. It should be noted that for a person of ordinary skill in the art, various improvements and modifications can be made without departing from the principles of the present disclosure. These improvements and modifications should also be considered to be the protection scope of the present disclosure.

The invention claimed is:

1. A modulated terahertz (THz) signal deflector, comprising:
   a first transparent substrate, a second transparent substrate, and a liquid crystal layer located between the first transparent substrate and the second transparent substrate, wherein
   a first transparent electrode layer and a second transparent electrode layer are respectively disposed on sides, adjacent to the liquid crystal layer, of the first transparent substrate and the second transparent substrate;
   a first photo-alignment layer and a second photo-alignment layer are respectively disposed on sides, adjacent to the liquid crystal layer, of the first transparent electrode layer and the second transparent electrode layer;
   the first transparent electrode layer and the second transparent electrode layer are both made of a material with high transmittance and good conductivity in a THz band;
   the photo-alignment layer has a control graph in which a molecule director is periodically and gradiently distributed along a specific direction;
   the control graph is configured to control a liquid crystal molecule director in the liquid crystal layer to be periodically and gradiently distributed along a specific direction to form a blazed-grating phase distribution based on a geometric phase, and deflect an incident circularly a polarized THz signal to a deflection angle θ, a grating period P, the deflection angle θ, and a frequency f of incident light have the following relationship: P·sin θ=c/f, wherein c is the speed of light in vacuum; and
   the modulated THz signal deflector further comprising a spacer located between the first transparent substrate and the second transparent substrate, wherein the spacer is configured to support the first transparent substrate and the second transparent substrate to form filling space of the liquid crystal layer.

2. The modulated THz signal deflector according to claim 1, wherein a thickness of the liquid crystal layer is 200-700 μm.

3. The modulated THz signal deflector according to claim 1, wherein the material used for the first transparent electrode layer and the second transparent electrode layer comprises graphene, PEDOT, or a metal wire grid.

4. The modulated THz signal deflector according to claim 1, wherein the liquid crystal layer is made of a dielectric material with birefringence.

5. The modulated THz signal deflector according to claim 4, wherein the birefringence of the liquid crystal layer is greater than or equal to 0.2 and less than or equal to 0.4.

* * * * *